US012705811B2

(12) United States Patent
Liu et al.

(10) Patent No.: US 12,705,811 B2
(45) Date of Patent: Aug. 11, 2026

(54) COMIC IMAGE GENERATING METHOD, COMPUTER DEVICE AND STORAGE MEDIUM

(71) Applicant: Beijing Zitiao Network Technology Co., Ltd., Beijing (CN)

(72) Inventors: Zheng Liu, Beijing (CN); Qi Song, Beijing (CN); Qi Wang, Beijing (CN); Tian Ge, Beijing (CN); Xinhui Lei, Beijing (CN); Zixuan Wei, Beijing (CN); Zixiu Xue, Beijing (CN); Panxin Yang, Beijing (CN); Xiawen Liang, Beijing (CN); Qiuye Cao, Beijing (CN); Yuxuan Yan, Beijing (CN); Hongyue Zhao, Beijing (CN); Jiayi Shen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 168 days.

(21) Appl. No.: 18/819,751

(22) Filed: Aug. 29, 2024

(65) Prior Publication Data

US 2025/0078210 A1 Mar. 6, 2025

(30) Foreign Application Priority Data

Aug. 31, 2023 (CN) .......................... 202311118258.7

(51) Int. Cl.
*G06T 5/50* (2006.01)
*G06T 11/60* (2026.01)

(52) U.S. Cl.
CPC ................ *G06T 5/50* (2013.01); *G06T 11/60* (2013.01); *G06T 2207/20221* (2013.01)

(58) Field of Classification Search
CPC .. G06T 5/50; G06T 11/60; G06T 2207/20221
See application file for complete search history.

(56) References Cited

U.S. PATENT DOCUMENTS 9,992,556 B1 * 6/2018 Price .................. H04N 21/4302
2007/0146360 A1 * 6/2007 Clatworthy ............ G06T 15/20 345/419

FOREIGN PATENT DOCUMENTS

CN 105809613 A 7/2016
CN 106023285 A 10/2016
(Continued)

OTHER PUBLICATIONS

China Patent Application No. 202311118258.7; Office Action; dated Jul. 12, 2025; 22 pages.

*Primary Examiner* — Said Broome
*Assistant Examiner* — Andrew Shin
(74) *Attorney, Agent, or Firm* — BakerHostetler

(57) ABSTRACT

A comic image generating method, a computer device and a storage medium, wherein the method includes: acquiring target objects of a plurality of categories in a comic storyboard, wherein the plurality of categories at least include a character category, a scene category and a prop category; determining, for the target object of each category, a target image matching the target object according to an object level of the target object, wherein the object level is determined according to a degree of importance of the target object, and target images corresponding to the target objects with different object levels are determined through different image determination modes; and combining the target images matching the target objects according to image layer levels corresponding to the plurality of categories, to obtain a comic image corresponding to the comic storyboard.

20 Claims, 2 Drawing Sheets

Acquiring target objects of a plurality of categories in a comic storyboard; wherein the plurality of categories at least include a character category, a scene category and a prop category — S101

Determining, for the target object of each category of the plurality of categories, a target image matching the target object according to an object level of the target object; wherein the object level is determined according to a degree of importance of the target object; and target images corresponding to the target objects with different object levels are determined through different image determination modes — S102

Combining the target images matching the target objects according to image layer levels corresponding to the plurality of categories, to obtain a comic image corresponding to the comic storyboard — S103

(56) References Cited

FOREIGN PATENT DOCUMENTS

| | | | |
|---|---|---|---|
| CN | 113505212 | A | 10/2021 |
| KR | 2022-0046373 | A | 4/2022 |

* cited by examiner

COMIC IMAGE GENERATING METHOD, COMPUTER DEVICE AND STORAGE MEDIUM

CROSS-REFERENCE TO RELATED APPLICATION(S)

This application claims the priority of Chinese Patent Application No. 202311118258.7 filed on Aug. 31, 2023, and the disclosure of the above-mentioned Chinese Patent Application is hereby incorporated in its entirety by reference as a part of this application.

TECHNICAL FIELD

Embodiments of the present disclosure relate to the technical field of computers, for example, to a comic image generating method and apparatus, a computer device and a storage medium.

BACKGROUND

For any comic image to be drawn, it may include many types of objects to be drawn. The conventional drawing method is to draw all types of objects to be drawn in a comic frame according to text descriptive information corresponding to the comic image, to obtain the comic image.

However, in the process of drawing, a generation difference between various objects in the comic image is often ignored, and a unified generation standard is adopted for image drawing, which not only increases the resource consumption of image drawing, but also reduces the efficiency and rationality of image drawing.

SUMMARY

Embodiments of the present disclosure at least provide a comic image generating method and apparatus, a computer device and a storage medium.

An embodiment of the present disclosure provides a comic image generating method, including:

- acquiring target objects of a plurality of categories in a comic storyboard; wherein the plurality of categories at least include a character category, a scene category and a prop category;
- determining, for the target object of each category of the plurality of categories, a target image matching the target object according to an object level of the target object; wherein the object level is determined according to a degree of importance of the target object; and target images corresponding to the target objects with different object levels are determined through different image determination modes; and
- combining the target images matching the target objects according to image layer levels corresponding to the plurality of categories, to obtain a comic image corresponding to the comic storyboard.

An embodiment of the present disclosure further provides a comic image generating apparatus, including:

- an acquisition module, configured to acquire target objects of a plurality of categories in a comic storyboard; wherein the plurality of categories at least include a character category, a scene category and a prop category;
- a first determination module, configured to determine, for the target object of each category of the plurality of categories, a target image matching the target object according to an object level of the target object; wherein the object level is determined according to a degree of importance of the target object, and target images corresponding to the target objects with different object levels are determined through different image determination modes; and
- a generation module, configured to combine the target images matching the target objects according to image layer levels corresponding to the plurality of categories, to obtain a comic image corresponding to the comic storyboard.

An alternative implementation of the present disclosure further provides a computer device including at least one processor and a memory in which machine-readable instructions executable by the at least one processor are stored, wherein the at least one processor is configured to execute the machine-readable instructions stored in the memory to execute the embodiment of the comic image generating method described above or the steps in any possible implementation of the above embodiment.

An alternative implementation of the present disclosure further provides a non-transient computer-readable storage medium, on which a computer program is stored, wherein the computer program, when executed by a computer device, is configured to cause the computer device to execute the embodiment of the comic image generating method described above or the steps in any possible implementation of the above embodiment.

For the description of the effects of the comic image generating apparatus, the computer device and the non-transient computer-readable storage medium, reference can be made to the description of the comic image generating method, which is not repeated here.

In order to make the above objects, features and advantages of the present disclosure more obvious and easier to understand, the following is a detailed description of exemplary embodiments with reference to the accompanying drawings.

BRIEF DESCRIPTION OF DRAWINGS

In order to explain the technical solution of the embodiments of the present disclosure more clearly, drawings necessary for the description of the embodiments, which are incorporated into and constitute a part of this specification, will be briefly introduced as below. These drawings illustrate the embodiments in accordance with the present disclosure and together with the specification, serve to explain the technical solution of the present disclosure. It should be understood that the following drawings only illustrate some embodiments of the present disclosure and should not be regarded as constituting any limitation to the scope of the present disclosure. For those ordinary skilled in the field, other related drawings can be obtained according to these drawings without creative work.

DETAILED DESCRIPTION

Figure 1:
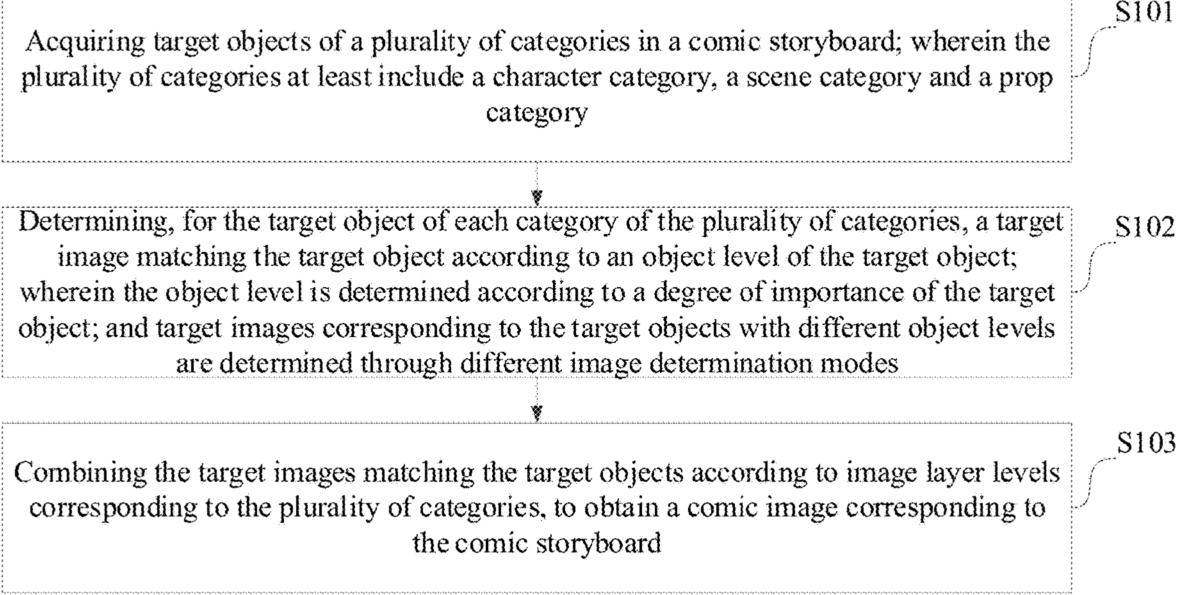
FIG. 1 shows a flowchart of a comic image generating method provided by an embodiment of the present disclosure.

In order to make the purposes, technical solutions and advantages of the embodiments of the present disclosure more definite, the technical solutions in the embodiments of the present disclosure will be described clearly and completely with reference to the accompanying drawings. Obviously, the described embodiments are merely part of but not all of the embodiments of the present disclosure. Components in embodiments of the present disclosure generally described and illustrated herein may be arranged and designed in various different configurations. Therefore, the following detailed description of the embodiments of the present disclosure is not intended to limit the scope of the claimed disclosure, but merely represents selected embodiments of the present disclosure. Based on the embodiments of the present disclosure, all other embodiments obtained by those skilled in the art without creative work belong to the scope of protection of the present disclosure.

In addition, the terms such as "first" and "second" in the description of the embodiments, the claims and the above drawings of the present disclosure are used to distinguish similar objects, and are not necessarily used to describe a specific order or sequence. It should be understood that the data so used can be interchanged under appropriate circumstances, so that the embodiments described herein can be implemented in other orders than those illustrated or described herein.

In the present disclosure, "a plurality of or several" refers to two or more than two. "and/or", which describes the relationship of related objects, means that there can be three kinds of relationships. For example, "A and/or B" may refer to the following three conditions: A exists alone; A and B both exist; and B exists alone. The character "/" generally indicates that the correlated former and latter objects are in an "OR" relationship.

It is found during research and study that, when generating comic images according to text contents such as novel contents, various objects that need to be drawn are often determined firstly according to the text contents, and then each object is drawn according to the attribute information of the various objects indicated by the text contents, to obtain the comic images. However, in the process of drawing, the generation differences between various objects in the comic images are often ignored, and unified generation standards are adopted for image drawing, which not only increases the resource consumption but also reduces the efficiency of image drawing. Therefore, how to improve the drawing efficiency to draw a reasonable comic image quickly and accurately has become a problem worthy of attention.

Based on the above research, the present disclosure provides a comic image generating method and apparatus, a computer device and a storage medium, in which different object levels correspond to different image determination modes and the object level is determined according to the degree of importance of the object, so that the target image is determined according to the object level of the target object. In this way, the determination of target images of various target objects can be realized by using different methods and different standards on the basis of considering the generation differences among target objects with different degrees of importance, which can not only transfer the focus of drawing resources to the target objects with higher object levels but also reduce the consumption of drawing resources on the target objects with lower object levels, and reduces the waste of drawing time on the target objects with lower object levels, thus improving the usage rationality of image drawing resources and the drawing efficiency. At the same time, after obtaining the target images corresponding to the target objects of a plurality of categories, the target images can be combined according to the layer level corresponding to each category, so that the target images can be combined reasonably and orderly, and a reasonable comic image corresponding to the comic storyboard can be obtained.

The shortcomings to be alleviated by the above-described solution are the results obtained by the inventor after practice and careful study. Therefore, the discovery process of the above problems and the solutions proposed in the present disclosure as below should be the contributions made by the inventor to the present disclosure in the process of the present disclosure.

It should be noted that similar symbols and letters indicate similar items in the following drawings. Accordingly, once an item is defined in one drawing, it does not need to be further defined and explained in subsequent drawings.

It should be understood that prior to using the technical solution disclosed in various embodiments of the present disclosure, users should be informed of the type, scope of usage, usage scenarios, etc. of personal information involved in the present disclosure in an appropriate way in accordance with relevant laws and regulations and be authorized by the users.

It should be noted that the specific terms mentioned in the embodiments of the present disclosure will be explained below.

"Prompt" refers to words for providing artificial intelligence (AI) with cues, which is a method that uses natural language to guide or inspire artificial intelligence models to complete specific tasks. The function of prompt is to provide an AI model with the context of input information and the parameter information of an input model, which can help the model to better understand the intention of an input and give a corresponding output.

For the convenience of understanding the embodiments of the present disclosure, firstly, a comic image generating method disclosed in the embodiment of the present disclosure is introduced in detail. The execution subject of the comic image generating method provided in the embodiment of the present disclosure is generally a terminal device or other processing devices with certain computing power. The terminal device can be a User Equipment (UE), a mobile device, a user terminal, a terminal, a Personal Digital Assistant (PDA), a handheld device, a computer device, etc. In some possible implementations, the comic image generating method can be realized by a processor calling computer-readable instructions stored in a memory.

Hereinafter, the comic image generating method provided by the embodiment of the present disclosure will be explained with reference to the case where a computer device is used as the execution subject, by way of example.

As shown in FIG. 1, a flowchart of a comic image generating method provided by an embodiment of the present disclosure may include the following steps.

S101, acquiring target objects of a plurality of categories in a comic storyboard; wherein the plurality of categories at least include a character category, a scene category and a prop category.

Here, the comic storyboard can be understood as a shot in a comic, and one comic storyboard corresponds to one comic image. Comic images corresponding to different comic storyboards are combined together according to the time sequence corresponding to the comic storyboards, so that a complete comic can be obtained. A comic storyboard can include target objects of a plurality of categories, and each category can include one or more target objects. The target object is the information such as characters, animals, articles, scenes, props, effects and so on, which appear in the comic storyboard.

The categories of the target objects can at least include a character category, a scene category and a prop category. The target objects under the character category are comic characters/roles appearing in the comic storyboard. The target objects under the scene category can be scenes where the comic storyboard occurs, such as hospitals, bus stops, office buildings, roads, schools, etc. The target objects under the prop category can be various types of props appearing in the comic storyboard, including props held by comic characters, props appearing in scenes, default props, etc. For example, the props can be weapon props, study props and working props held by comic characters, trash cans next to bus stops, street lamps, street signs, teaching aids in classrooms, etc.

In some implementations, for any comic storyboard that requires generating a comic image, the target objects of various categories appearing in the comic storyboard can be acquired firstly. For example, for a comic storyboard, the acquired target objects of a plurality of categories include character 1, character 2, bus stop, street lamp and lamp board.

S102, determining, for the target object of each category of the plurality of categories, a target image matching the target object according to an object level of the target object; wherein the object level is determined according to a degree of importance of the target object; and target images corresponding to the target objects with different object levels are determined through different image determination modes.

Here, the object level can be determined according to the degree of importance of the target object, and the higher the object level, the more important the target object is. The degree of importance of the target object can be determined according to the number of times that the target object appears in a comic composed of comic images corresponding to all of the comic storyboards. Of course, the degree of importance and the object level of each target object can also be specified in advance.

The target object and the object level of the target object can be acquired at the same time. Alternatively, it's also possible to firstly acquire the degree of importance of the target object while acquiring the target object, and then determine the object level of the target object according to a mapping relationship between the degree of importance and the object level.

A target image is an image that matches the target object, such as a character image corresponding to a character, a scene image corresponding to a scene, and a prop image corresponding to a prop. The image determination mode is the way to determine the target image corresponding to the target object. The image determination modes corresponding to target objects of different object levels and different categories can be different. For example, the image determination mode can include a method by using artificial intelligence model, a method by spatial modeling, a method by searching from third-party resource channels, a method by searching in a created image asset library, and so on. Among them, an image asset library includes generated images corresponding to the objects whose object level belongs to a preset level.

After acquiring the target objects of various categories, the step of determining the target image corresponding to each target object can be started. For example, for the target object of each category, the image determination mode corresponding to the target object can be determined according to the acquired object level of the target object, and then the target image corresponding to the target object can be determined by using the image determination mode.

Optionally, for S102, a target image matching the target object can be determined according to the category and/or object level of the target object. Here, different image determination modes can be set for different categories, and there can be a preset priority relationship between the image determination mode corresponding to the category and the image determination mode corresponding to the object level. After the target object is acquired, the target image can be determined by using the image determination mode determined according to the category or object level. Alternatively, after the target object is acquired, if the image determination mode determined according to the category and the image determination mode determined according to the object level are consistent with each other, the target image can be determined according to the image determination mode; if the image determination modes determined according to the category and the object level are inconsistent, a target mode can be determined from the two determined image determination modes according to the preset priority, and the target image corresponding to the target object can be determined according to the target mode.

In an embodiment, S102 can be implemented according to the following steps.

S102-1: under the condition that the object level of the target object belongs to a preset level, searching whether there is a generated image matching the target object from an image asset library. The image asset library includes pre-generated images for candidate objects belonging to the preset level.

Here, the preset level can be set according to experience, which is not particularly limited in the embodiment of the present disclosure. For example, there may be a plurality of object levels, and the preset level may be at least one of the plurality of object levels. For example, the object levels can include five levels of S, A, B, C and D, and the preset level can be levels S and A. Candidate objects are those objects whose object level belongs to the preset level in a previously determined comic storyboard. The candidate objects can be objects of any category, and the generated images are images which are pre-generated by using artificial intelligence (AI) and matching the candidate objects. The image asset library can be a dynamically updated resource library, which can include generated images corresponding to a plurality of candidate objects. The generated image matching the target object can be an image corresponding to a candidate object consistent with the target object.

In a possible implementation, when determining the target image of any target object, it can be judged whether the object level of the target object belongs to the preset level at first. If the object level of the target object belongs to the preset level, the image determination mode can be determined as follows: firstly, finding out whether there is a matching image from the image asset library, and if there is no matching image, an imaging generating method by using artificial intelligence (AI) can be used as the image determination mode. Further, according to the determined image determination mode, it can be judged whether there is a candidate object consistent with the target object by searching from the image asset library, and if there is such a candidate object, a generated image corresponding to the candidate object can be used as the generated image matching the target object; if there is no such a candidate object, it can be determined that there is no generated image matching the target object, and then the target image can be generated with reference to Mode I and Mode II described later. In addition, if the object level of the target object does not belong to the preset level, the target image can be determined with reference to S1 and S2 described later.

S102-2: If there is a generated image matching the target object, determining the target image matching the target object according to the generated image.

In a possible implementation, when a generated image matching the target object is found from the image asset library, the generated image can be directly used as the target image corresponding to the target object.

In another embodiment, if there is no generated image matching the target object in the image asset library, the target image can be generated in different ways according to the category of the target object. For example, when the category of the target object belongs to the scene category or the prop category, the following mode I can be adopted to generate the target image; when the category of the target object belongs to the character category, the following mode II can be adopted to generate the target image.

Mode I, under the condition that there is no generated image matching the target object in the image asset library, in response to the target object belonging to the scene category or the prop category, acquiring generation auxiliary text information corresponding to the target object; generating a target image corresponding to the target object according to the generation auxiliary text information by using an artificial intelligence model; and storing the target image and the target object in the image asset library in an associated manner.

Here, the generation auxiliary text information is the input information that can be understood by the artificial intelligence model, which is used to characterize the object characteristics of the target object and can be determined in advance according to a descriptive text corresponding to the target object. The generation auxiliary text information is different for different target objects. The generation auxiliary text information can be determined according to text keywords of the target object under a plurality of image generation dimensions. It is easy to understand that the generation auxiliary text information corresponding to the target object can be at least one prompt for describing the target object.

In an embodiment, the comic image generating method provided by the embodiment of the present disclosure can be applied to a novel-to-comic production scenario, that is, the comic images are generated according to a novel, the comic storyboards can be separated from the novel, and the generated comic images can be combined into a vertical (transverse) comic corresponding to the novel. In this scenario, the generation auxiliary text information can be determined according to the following steps.

Step 1, acquiring a target novel from which a comic is to be generated.

Here, the target novel is the novel that needs to generate a corresponding vertical (transverse) comic, and the target novel can have any novel genre and any length.

Step 2, splitting the target novel according to a novel content of the target novel, to obtain novel segments corresponding to the target novel, and determining comic storyboards corresponding to the novel segments and target objects in each comic storyboard.

In a possible implementation, after the target novel is acquired, the target novel can be split according to the novel content, chapters and other information of the target novel, so that novel segments corresponding to the target novel can be obtained. One novel segment can correspond to one comic storyboard or one chapter in a vertical (transverse) comic. Then, for each novel segment, a storyboard processing can be carried out according to a segment content of the novel segment, so as to obtain the comic storyboard corresponding to the novel segment. At the same time, for each comic storyboard, the target object corresponding to the comic storyboard in each category can be determined according to the segment content of the novel segment.

Step 3, for each target object, determining the generation auxiliary text information corresponding to the target object according to the segment content of the novel segment.

In a possible implementation, for each target object in the comic storyboard, information can be extracted under a plurality of preset image generation dimensions according to the segment content of the novel segment, and a text keyword under each image generation dimension can be acquired. Among them, one or more text keywords can be acquired for each image generation dimension. For example, the image generation dimensions can include, but be not limited to, characters, scenes, props, costumes, time, ambient light, camera language, shot type, viewing angle, facial expression, action, human-article interaction, human-human interaction, article-article interaction, dialogue, inner monologue and other dimensions.

Then, according to the category of the target object, a target image generation dimension related to the category can be determined from a plurality of image generation dimensions. Then, generation auxiliary text information corresponding to the target object can be generated according to the text keywords under the target image generation dimension. Among them, the generation auxiliary text information can be information in a specific language (a language that the model can understand), and one text keyword can correspond to one piece of generation auxiliary text information. The generation auxiliary text information corresponding to the target object can be obtained by splicing the pieces of generation auxiliary text information corresponding to the text keywords under the target image generation dimension.

In a possible implementation, under the condition that there is no generated image matching the target object in the image asset library, if the target object belongs to the scene category or the prop category, it can be determined to generate the target image by using the AI generating method. Therefore, the generation auxiliary text information related to the target object can be obtained. Then, the generation auxiliary text information can be input into a pre-trained artificial intelligence model, which can perform information recognition on the generation auxiliary text information and output the target image related to the target object according to the recognition result.

For the target image output by the artificial intelligence model, the details in the image are richer and the image quality is higher.

Optionally, in order to further improve the accuracy of the generated target image, after the target image output by the artificial intelligence model is obtained, the target image can be finely adjusted, so as to obtain a target image with higher accuracy and rationality. In this way, by adjusting the target image, the guarantee for the target image can be provided and the rationality and accuracy of the target image can be improved because the output of artificial intelligence model is random.

Furthermore, after the target image corresponding to the target object is generated by using the artificial intelligence model, the target image and the target object can be stored in the image asset library in an associated manner. In this way, the image asset library can be dynamically updated, and the number of candidate objects and generated images in the image asset library can be enriched.

Optionally, under the condition that the target object belongs to the scene category or the prop category, even if there is a generated image matching the target object in the image asset library, it still can choose to adopt the above-mentioned mode I to generate the target image by using the artificial intelligence model when the correlation between the generated image and the target object is lower than a preset similarity. Then, the generated image matching the target object in the image asset library can be updated by using the target image.

In an embodiment, a separate generation rule can also be set for the object of the prop category, which may include: using the steps S1 and S2 described later to generate the target image regardless of the object level of the object of the prop category.

Mode II, under the condition that there is no generated image matching the target object in the image asset library, in response to the target object belonging to the character category, acquiring the generation auxiliary text information corresponding to the target object; calling an object generation model corresponding to the target object, and generating the target image corresponding to the target object according to the generation auxiliary text information by using the object generation model.

Here, the object generation model is a pre-trained dedicated model for generating images corresponding to specific objects. One object generation model corresponds to a preset group of objects. For example, an asset planning can be carried out in advance to determine target objects with both of high degree of importance and high object level as a preset group of objects. The objects in this preset group generally are used frequently. Therefore, an object generation model corresponding to these objects can be trained separately in advance to generate the target image by using the object generation model.

In a possible implementation, under the condition that there is no generated image matching the target object in the image asset library, if the target object belongs to the character category, it can be judged whether there is an object generation model matching the target object. If so, the object generation model can be called, and the acquired generation auxiliary text information related to the target object can be input into the object generation model, which can carry out information recognition on the generation auxiliary text information and output the target image related to the target object according to the recognition result.

If there is no object generation model matching the target object, the generation auxiliary text information of the target object can be input into the artificial intelligence model to obtain the target image output by the artificial intelligence model.

Similarly, in order to further improve the accuracy of the generated target image, after the target image output by the object generation model is obtained, the target image can be finely adjusted, so as to obtain a target image with higher accuracy and rationality. By adjusting the target image, the guarantee for the target image can be provided and the rationality and accuracy of the target image can be improved because the output of artificial intelligence model is random.

Optionally, if there is a corresponding object generation model for the target object, after the target image related to the target object output by the object generation model is obtained, the target object and the target image may or may not be stored in the image asset library in an associated manner, which is not specifically limited in this embodiment of the present disclosure and can be set according to actual generation requirements.

Optionally, if there is no generated image matching the target object in the image asset library and the target object belongs to the character category, the target image can also be generated by spatial modeling. For example, a three-dimensional model corresponding to the target object can be constructed by means of spatial modeling according to the generation auxiliary text information corresponding to the target object, and then a two-dimensional image can be obtained by performing dimension reduction processing on the three-dimensional model; the two-dimensional image can be used as the target image corresponding to the target object.

In an embodiment, under the condition that the object level of the target object does not belong to the preset level, the target image can be generated according to S1 and S2 as follows.

S1, under the condition that the object level of the target object does not belong to the preset level, searching a matching image matched with the target object from a plurality of authorized resource channels.

Here, if the object level of the target object does not belong to the preset level, it indicates that the target object belongs to an object with low degree of importance, and whether this object possesses consistency in different comic images may not be paid too much attention by users, so a relatively simple image can be generated. Resource channels are channels for providing various images. For example, resource channels can be various authorized image search platforms, and different search platforms provide different images. Even for a same object, different search platforms provide different images. For example, image search platforms can be public search platforms corresponding to various public image databases. A matching image is an image related to the target object that is searched from the resource channels.

In a possible implementation, under the condition that the object level of the target object does not belong to the preset level, no matter what category the target object belongs to, it is possible to search for a channel image matching the target object from various authorized resource channels according to the target object and/or the category to which the target object belongs. One or more matching images that are matched with the target object can be found from the resource channels. When there is a plurality of channel images, one channel image can be randomly selected as the target image corresponding to the target object. Alternatively, one channel image can be selected from a plurality of channel images as the target image corresponding to the target object according to the image quality and image content of each channel image. When only one channel image is found, this channel image can be directly used as the target image corresponding to the target object.

S2, performing animation stylization processing on the matching image by using the artificial intelligence model, to obtain the target image.

Here, the artificial intelligence model can have the animation stylization processing function, which can process the image into an image with animation style.

In a possible implementation, after the matching image is obtained, the matching image can be input into the artificial intelligence model, which can call the animation stylization processing function to perform animation stylization processing on the matching image, so as to obtain the target image corresponding to the target object. For example, when the target object is a street lamp and the matching image is a street lamp image, the street lamp image can be input into the artificial intelligence model to obtain a street lamp image with animation style.

In an embodiment, for S102-2, it can also be implemented according to the following steps.

S102-2-1, acquiring the generation auxiliary text information corresponding to the target object.

S102-2-2: performing content adjustment on the generated image by using the artificial intelligence model according to the generation auxiliary text information, to obtain the target image.

Here, the content adjustment can include, but be not limited to, style adjustment, content expansion, viewing angle adjustment, shot type adjustment, effect adjustment and theme adjustment. For example, content expansion can include horizontal content expansion, vertical content expansion or even 360-degree content expansion.

In a possible implementation, after the generated image matching the target object is determined from the image asset library, the generation auxiliary text information related to the target object and/or the text keyword of the comic storyboard where the target object is located under each image generation dimension can also be acquired. Then, the generated image, the generation auxiliary text information and/or the text keyword of the comic storyboard where the target object is located under each image generation dimension, together, can be input into the artificial intelligence model, which can adjust the image content of the generated image according to the information related to content adjustment in the generation auxiliary text information and/or the information related to content adjustment in the text keyword of the comic storyboard where the target object is located under each image generation dimension, to obtain the target image.

In an embodiment, the content adjustment operation may include a viewing angle switching operation, and the generation auxiliary text information corresponding to the target object may include viewing angle auxiliary text information for indicating the observation viewing angle corresponding to the target object. Here, the observation viewing angle is the viewing angle when observing the target object. For example, the observation viewing angle can be a main viewing angle, left and right viewing angles, a top viewing angle, a horizontal viewing angle, a left x-degree viewing angle, a right x-degree viewing angle and so on, and x can be any value from 0 to 360. The image generation dimensions may include viewing angle dimension, the text keywords may include the text keyword under the viewing angle dimension, and the generation auxiliary text information may include viewing angle auxiliary text information generated according to the text keyword under the viewing angle dimension.

Under the condition that the generation auxiliary text information includes the viewing angle auxiliary text information, the above S102-2-2 can be implemented by the following step: performing viewing angle switching on an image content of the generated image by using artificial intelligence model according to a target viewing angle indicated by the viewing angle auxiliary text information, to obtain the target image matching the target viewing angle.

Here, the target viewing angle is the viewing angle of observing the target object in the current comic storyboard, and it is the viewing angle indicated by the viewing angle auxiliary text information. For example, the target viewing angle can be a left-45-degree viewing angle.

In a possible implementation, the artificial intelligence model can be used to determine whether the current viewing angle of the generated image is consistent with the target viewing angle. If so, it indicates that the generated image can be directly used as the target image without the need of switching the viewing angle. If not, the viewing angle of the image content of the generated image can be switched according to the target viewing angle to obtain the target image at the target viewing angle. For example, when the current viewing angle corresponding to the generated image is the main viewing angle, the viewing angle of the image content of the generated image can be switched according to the left-45-degree viewing angle, and the target image at left-45-degree viewing angle can be obtained.

In this way, for the case of vertical (transverse) comic, one chapter in the vertical (transverse) comic can include a plurality of consecutive comic images, and for a certain target object (such as an office) among the plurality of consecutive comic images, the viewing angle can constantly change. For example, the first comic image shows the whole office from the main viewing angle, the second comic image shows the side view of the office from the left viewing angle, and the third comic image shows the layout of the office from the top viewing angle. In this case, the offices in the three consecutive comic images belong to the same object. Therefore, through the viewing angle switching of the generated office image according to the viewing angle auxiliary text information, a 360-degree viewing angle switching can be realized, so that the accurate target image can be obtained quickly and flexibly.

In an embodiment, the content adjustment operation may also include a shot type switching operation, and the generation auxiliary text information corresponding to the target object may include shot type auxiliary text information for indicating shot type information corresponding to the target object. Here, the shot type information is the shot type for photographing the target object. For example, the shot type can be classified into foreground, close shot, long shot, medium shot, close-up shot and so on. The image generation dimensions can include shot type dimension, the text keywords can include a text keyword under the shot type dimension, and the generation auxiliary text information can include shot type auxiliary text information generated according to the text keyword under the shot type dimension.

Under the condition that the generation auxiliary text information includes the shot type auxiliary text information, the above S102-2-2 can be implemented by the following step: performing shot type adjustment on the generated image by using artificial intelligence model according to a target shot type indicated by the shot type auxiliary text information, to obtain the target image matching the target shot type.

Here, the target shot type is the shot type described for the target object in the current comic storyboard, which is indicated by the shot type auxiliary text information. For example, the target shot type can be a close-up shot.

In a possible implementation, the artificial intelligence model can be used to determine whether the current shot type of the generated image is consistent with the target shot type. If so, it indicates that the generated image can be directly used as the target image without the need of switching the shot type. If not, the shot type of the image content of the generated image can be switched according to the target shot type, to obtain the target image in the target shot type. For example, if the current shot type corresponding to the generated image is medium shot, the shot type of the image content of the generated image can be adjusted according to the close-up shot type (that is, the medium shot is adjusted to a close-up shot) to obtain the target image of the target object in close-up shot.

In this way, for the case of vertical (transverse) comic, one chapter in the vertical (transverse) comic can include a plurality of consecutive comic images, and for a certain target object (such as a target character) among the plurality of consecutive comic images, the shot type can constantly change. For example, the first comic image shows the target character in a long shot, the second comic image shows the target character in a close shot, and the third comic image shows the target character in a close-up shot. In this case, the target characters in the three consecutive comic images belong to a same object. Therefore, through the shot type adjustment of the generated target character image according to the shot type auxiliary text information, the target image matching each comic image can be obtained quickly and flexibly.

Optionally, the generation auxiliary text information may include both the viewing angle auxiliary text information and the shot type auxiliary text information, and the generated image corresponding to each target object may be subjected to viewing angle switching and shot type adjustment according to the viewing angle auxiliary text information and the shot type auxiliary text information before the generated image corresponding to each target object is obtained.

In an embodiment, the content adjustment operation may also include a content expansion operation, and the generation auxiliary text information corresponding to the target object may include object expansion text information for indicating to expand the object to be expanded in the generated image. Here, the object to be expanded is the object that needs to be newly added. For example, when the generated image is a bus stop image, the object to be expanded can be street lamp, zebra crossing lines, car, traffic light, etc.; when the generated image is a hospital image, the object to be expanded can be ambulance, medical equipment, doctor, patient, etc.; when the generated image is an office image, the object to be expanded can be office equipment, employee, living equipment, etc. For example, the image generation dimensions can include object expansion dimension, the text keywords can include a text keyword under the object expansion dimension, and the generation auxiliary text information can include object expansion text information generated according to the text keyword under the object expansion dimension. Alternatively, the object expansion text information can also be obtained by content association according to the text keyword under each image generation dimension after obtaining the text keyword under each image generation dimension of the comic storyboard, and can be supplemented in the generation auxiliary text information generated according to the text keyword.

Under the condition that the generation auxiliary text information includes object expansion text information, the above S102-2-2 can be implemented by the following step: performing content expansion on the image content of the generated image by using artificial intelligence model according to the object to be expanded indicated by the object expansion text information, to obtain the target image including the object to be expanded.

Here, the object to be expanded is the object that needs to be added in the generated image, and is the object indicated by the object expansion text information.

In a possible implementation, the artificial intelligence model can be used to add the object to be expanded, in the horizontal, vertical and even 360-degree directions of the image content according to the current image content and style of the generated image, so that the target image including the object to be expanded can be obtained. For example, if the generated image is a bus stop image, street lamps and trees can be expanded at both sides of the bus stop, roads and vehicles can be expanded in front of the bus stop, intersections and traffic lights can be expanded at one side of the bus stop, and birds and clouds can be expanded above the bus stop, so that the target image with expanded image content can be obtained.

Alternatively, after the generated image corresponding to the target object is obtained, the generated image can also be directly input into the artificial intelligence model, which can carry out content association according to the image content in the generated image by using an image expansion function and carry out content expansion based on the association result, to obtain the expanded target image. The expanded target image includes not only the original image content in the generated image, but also the newly expanded objects.

Optionally, the generation auxiliary text information may include viewing angle auxiliary text information, shot type auxiliary text information and object expansion text information at the same time. Between obtaining the generated images corresponding to the target objects, the generated image corresponding to each target object can be subjected to viewing angle switching, shot type adjustment and content expansion at the same time according to the viewing angle auxiliary text information, the shot type auxiliary text information and the object expansion text information, respectively.

In an embodiment, the content adjustment can also include style adjustment, effect adjustment, theme adjustment, etc. For the style adjustment, the artificial intelligence model can be used to switch the style of the image content of the generated image according to the time indicated by the time auxiliary text information in the generation auxiliary text information, so as to obtain the target image. For example, the style adjustment can include adjusting the current style into a night style, a daytime style, a fresh style, a literary and artistic style, a fashion style and so on. For the effect adjustment, for example, the artificial intelligence model can be used to process the effect of the image content of the generated image according to a target effect indicated by the generation auxiliary text information, so as to obtain the target image with the target effect. For example, it can add dynamic effects, viewing angle effects, gray levels, shadow effects or the like to the generated image. For the theme adjustment, for example, the artificial intelligence model can be used to switch the theme of the image content of the generated image according to a target theme indicated by the generation auxiliary text information, so as to obtain the target image with the target theme. For example, the generated image can be switched to have various holiday themes, various activity themes, and so on.

Optionally, after performing the content adjustment to the generated image by using the artificial intelligence model to obtain the target image, the target image and the target object can be stored in the image asset library in an associated manner, so as to update the image asset library.

In a possible embodiment, the content adjustment operation for the image by using the artificial intelligence model can also be performed after obtaining the comic image corresponding to the comic storyboard through S103. For example, after obtaining the comic image corresponding to the comic storyboard by using S103, the comic image can be input into the artificial intelligence model, which can carry out content association according to the image content in the comic image by using an image expansion function and carry out content expansion based on the association result, to obtain the expanded comic image. The expanded comic image can not only have the original content, but also be added with new content in the horizontal, vertical or even 360-degree directions.

Optionally, after target objects of a plurality of categories in the comic storyboard are acquired, an overlapping degree between the generation auxiliary text information corresponding to the current comic storyboard and the generation auxiliary text information corresponding to a previous comic storyboard can be determined. If the overlapping degree is greater than a preset overlapping degree, it can directly acquire the comic image (also referred to as previous comic image) corresponding to the previous comic storyboard. Then, the previous comic image and the generation auxiliary text information corresponding to the current comic storyboard are input into the artificial intelligence model, so that the content of the input, previous comic image can be adjusted (such as viewing angle switching, shot type adjustment, content expansion, etc.) according to the generation auxiliary text information corresponding to the current comic storyboard by using the artificial intelligence model, thereby obtaining the comic image corresponding to the current comic storyboard.

S103: combining the target images matching the target objects according to image layer levels corresponding to the plurality of categories, to obtain a comic image corresponding to the comic storyboard.

Here, target objects of different categories can be located in different layers of the image, so different categories can correspond to different image layer levels. When combining the target images into a comic image corresponding to the comic storyboard, the layer level corresponding to each category can be determined according to the relationship between the target objects of the plurality of categories. Furthermore, when determining the comic images corresponding to different comic storyboards, the image layer levels corresponding to the categories may be different for different comic storyboards. For example, when determining the comic image 1 corresponding to the comic storyboard 1, the scene category can correspond to the first level, the character category can correspond to the second level, and the prop category can correspond to the third level; when determining the comic image 2 corresponding to the comic storyboard 2, the scene category can correspond to the first level, the prop category can correspond to the second level, and the character category can correspond to the third level; the third level is located above the second level, and the second level is located above the first level. Optionally, the layer level corresponding to each category can also be preset.

In a possible implementation, after obtaining the target image of each target object, the layer level corresponding to each category can be determined according to the positional relationship between target objects. According to the layer level corresponding to each category, the target images of the target objects are integrated, so as to obtain the comic image corresponding to the comic storyboard. For example, if bubble information is also included in each comic storyboard, each piece of bubble information corresponding to the comic storyboard can be determined according to the text keywords of the comic storyboard under a plurality of image generation dimensions, and the bubble information can be filled in the comic image to obtain a complete comic image corresponding to the comic storyboard.

Optionally, after the target images of the target objects are integrated, the details of the integrated image can be finely adjusted in such a manner that the guarantee can be provided, so as to obtain a comic image with better accuracy and rationality.

It should be understood that, after acquiring the target objects of a plurality of categories in the comic storyboard, the layer level corresponding to each category can be determined firstly, and then the target image of each target object can be determined; it's also possible to determine the target image of each target object firstly, and then determine the layer level of each category. In the embodiment of the present disclosure, there is no strict execution order between the step of determining the layer level and the step of determining the target image.

For example, if the target object of the character category is character 1, the target object of the scene category is bus stop, and the target object of the prop category is street lamp and street sign, after the character image corresponding to character 1, the stop image corresponding to the bus stop, the street lamp image corresponding to the street lamp and the street sign image corresponding to the street sign are determined, the stop image can be placed in the underlying layer, the street lamp image and the street sign image can be placed in the middle layer, and the character image can be placed in the top layer, according to the image layer levels corresponding to the categories, and then the positions of the target objects in each image are appropriately adjusted. In this way, a complete comic image can be obtained by combining.

Based on the above embodiments, since different object levels correspond to different image determination modes and since the object level is determined according to the degree of importance of the object, the determination of the target images according to the object levels of the target objects can be realized by using different modes and different standards on the basis of considering the generation differences among the target objects with different degrees of importance. In this way, it can not only transfer the focus of drawing resources to the target objects with higher object levels, but also reduce the consumption of drawing resources on the target objects with lower object levels, and also reduce the waste of drawing time on the target objects with lower object levels, thus improving the usage rationality of image drawing resources and drawing efficiency. At the same time, after obtaining the target images corresponding to the target objects of the plurality of categories, the target images can be combined according to the image layer levels corresponding to the categories, so that the target images can be combined reasonably and orderly, and a reasonable comic image corresponding to the comic storyboard can be obtained.

It can be understood by those skilled in the art that in the above-mentioned method of exemplary embodiments, the writing order of various steps does not mean strict execution order or constitute any limitation on the implementation process, and the specific execution order of each step should be determined according to its function and possible internal logic.

Based on the same inventive concept, the embodiment of the present disclosure further provides a comic image generating apparatus corresponding to the comic image generating method. Since the principle of solving problems by the apparatus in the embodiment of the present disclosure is similar to the above-mentioned comic image generating method in the embodiment of the present disclosure, the implementation of the apparatus can refer to the implementation of the method and will not be repeated here.

Figure 2:
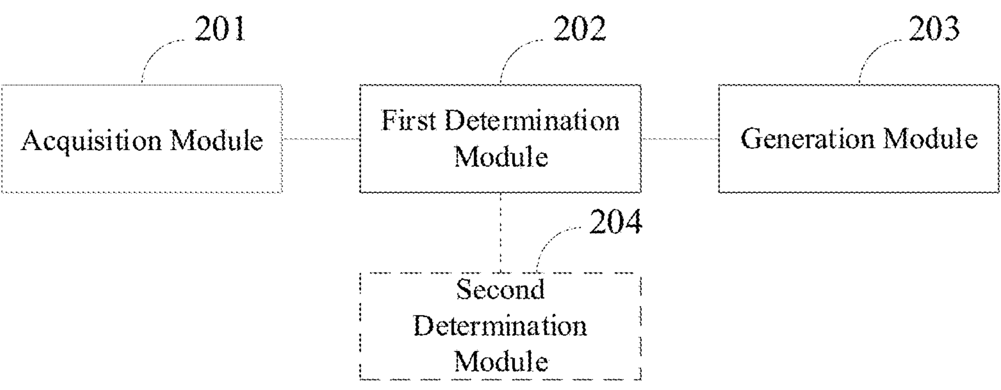
FIG. 2 shows a schematic diagram of a comic image generating apparatus provided by an embodiment of the present disclosure.

As shown in FIG. 2, which is a schematic diagram of a comic image generating apparatus provided by an embodiment of the present disclosure. The comic image generating apparatus includes:

an acquisition module 201, configured to acquire target objects of a plurality of categories in a comic storyboard; wherein the plurality of categories at least include a character category, a scene category and a prop category;

a first determination module 202, configured to determine, for the target object of each category of the plurality of categories, a target image matching the target object according to an object level of the target object; wherein the object level is determined according to a degree of importance of the target object; and target images corresponding to the target objects with different object levels are determined through different image determination modes; and a generation module 203, configured to combine the target images matching the target objects according to image layer levels corresponding to the plurality of categories, to obtain a comic image corresponding to the comic storyboard.

In a possible embodiment, when determining a target image matching the target object according to an object level of the target object, the first determination module 202 is configured to:

in response to the object level of the target object belonging to a preset level, judge whether there is a generated image matching the target object by searching from an image asset library; wherein the image asset library includes images pre-generated for candidate objects belonging to the preset level;

if so, determine the target image matching the target object according to the generated image.

In a possible embodiment, the first determination module 202 is further configured to:

if there is no generated image matching the target object, in response to the target object belonging to the scene category or the prop category, acquire generation auxiliary text information corresponding to the target object;

generate the target image corresponding to the target object according to the generation auxiliary text information by using an artificial intelligence model; and store the target image and the target object in the image asset library in an associated manner.

In a possible embodiment, the first determination module 202 is further configured to:

if there is no generated image matching the target object, in response to the target object belonging to the character category, acquire the generation auxiliary text information corresponding to the target object; and call an object generation model corresponding to the target object, and generate the target image corresponding to the target object according to the generation auxiliary text information by using the object generation model.

In a possible embodiment, when determining a target image matching the target object according to an object level of the target object, the first determination module 202 is configured to:

in response to the object level of the target object not belonging to the preset level, search for a matching image matched with the target object from a plurality of authorized resource channels; and perform animation stylization processing on the matching image by using the artificial intelligence model, to obtain the target image.

In a possible embodiment, when determining a target image matching the target object according to the generated image, the first determination module 202 is configured to:

acquire the generation auxiliary text information corresponding to the target object; and perform content adjustment on an image content of the generated image according to the generation auxiliary text information by using the artificial intelligence model, to obtain the target image.

In a possible embodiment, the generation auxiliary text information includes viewing angle auxiliary text information for indicating an observation viewing angle corresponding to the target object;

when performing content adjustment on an image content of the generated image according to the generation auxiliary text information by using the artificial intelligence model to obtain the target image, the first determination module 202 is configured to:

perform viewing angle switching on the image content of the generated image according to a target viewing angle indicated by the viewing angle auxiliary text information by using the artificial intelligence model, to obtain the target image matching the target viewing angle.

In a possible embodiment, the generation auxiliary text information includes shot type auxiliary text information for indicating shot type information corresponding to the target object;

when performing content adjustment on an image content of the generated image according to the generation auxiliary text information by using the artificial intelligence model to obtain the target image, the first determination module 202 is configured to:

perform shot type adjustment on the image content of the generated image according to a target shot type indicated by the shot type auxiliary text information by using the artificial intelligence model, to obtain the target image matching the target shot type.

In a possible embodiment, the generation auxiliary text information includes object expansion text information;

when performing content adjustment on an image content of the generated image according to the generation auxiliary text information by using the artificial intelligence model to obtain the target image, the first determination module 202 is configured to:

perform content expansion on the image content of the generated image according to a target to be expanded indicated by the object expansion text information by using the artificial intelligence model, to obtain the target image including the target to be expanded.

In a possible embodiment, the apparatus further includes:

a second determination module 204, configured to determine the generation auxiliary text information according to the following steps:

acquiring a target novel from which a comic is to be generated;

splitting the target novel according to a novel content of the target novel to obtain novel segments corresponding to the target novel, and determining the comic storyboard corresponding to each novel segment and the target objects in each comic storyboard;

for each target object, determining the generation auxiliary text information corresponding to the target object according to a segment content of the novel segment corresponding to the target object.

For the description of the processing flow of each module in the apparatus and the interaction flow between modules, reference can be made to the relevant description in the above method embodiments, and will not be described in detail here.

Figure 3:
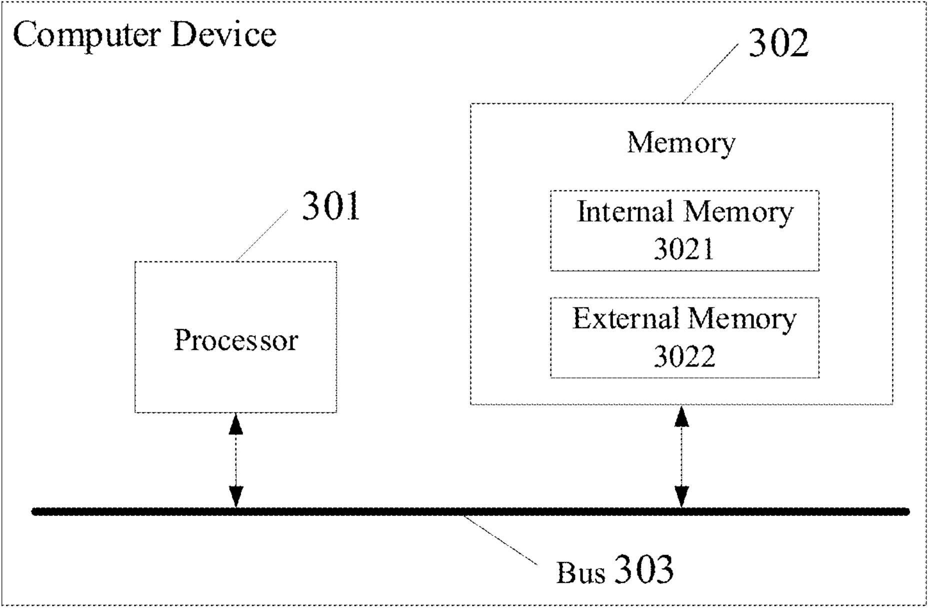
FIG. 3 shows a schematic structural diagram of a computer device provided by an embodiment of the present disclosure.

Based on the same technical concept, the embodiment of the present disclosure further provides a computer device. Referring to FIG. 3, which is a schematic structural diagram of a computer device provided by an embodiment of the present disclosure, including a processor 301, a memory 302 and a bus 303.

The memory 302 stores machine-readable instructions executable by the processor 301, and the processor 301 is used for executing the machine-readable instructions stored in the memory 302. When the machine-readable instructions are executed by the processor 301, the processor 301 performs the following steps: S101: acquiring target objects of a plurality of categories in a comic storyboard, wherein the plurality of categories at least include a character category, a scene category and a prop category; S102, determining, for the target object of each category of the plurality of categories, a target image matching the target object according to an object level of the target object, wherein the object level is determined according to a degree of importance of the target object, and the target images corresponding to the target objects with different object levels are determined through different image determination modes; and S103, combining the target images matching the target objects according to image layer levels corresponding to the plurality of categories, to obtain a comic image corresponding to the comic storyboard.

The memory 302 includes an internal memory 3021 and an external memory 3022. The internal memory 3021 here is also referred to as an internal storage, which is used to temporarily store the operation data in the processor 301 and the data exchanged with the external memory 3022 such as a hard disk. The processor 301 exchanges data with the external memory 3022 through the internal memory 3021, and when the computer device operates, the processor 301 communicates with the memory 302 through the bus 303, so that the processor 301 executes the execution instructions mentioned in the above method embodiments.

The embodiment of the present disclosure further provides a computer-readable storage medium, on which a computer program is stored, and when the computer program is executed by a processor, the steps of the comic image generating method described in the above method embodiments are executed. The storage medium can be a volatile or nonvolatile computer-readable storage medium.

A computer program product of the comic image generating method provided by the embodiment of the present disclosure includes a computer-readable storage medium in which program codes are stored, and the program codes include instructions that can be used to execute the steps of the comic image generating method described in the above method embodiments. For details, reference can be made to the above method embodiments, which will not be repeated here.

The computer program product can be embodied in hardware, software or a combination thereof. In one alternative embodiment, the computer program product is embodied as a computer storage medium, and in another alternative embodiment, the computer program product is embodied as a software product, such as a Software Development Kit (SDK) and the like.

It can be clearly understood by those skilled in the art that for the convenience and conciseness of description, the specific working process of the system and device described above can refer to the corresponding process in the aforementioned method embodiments, and will not be repeated here. It should be understood that in several embodiments provided by the present disclosure, the revealed systems, devices and methods can be realized in other ways. The device embodiments described above are only schematic. For example, the division of the units is only a logical function division, and there may be other division ways in actual implementation. For example, a plurality of units or components may be combined or integrated into another system, or some features may be ignored or not implemented. On the other hand, the mutual coupling or direct coupling or communication connection as shown or discussed can be indirect coupling or communication connection through some communication interfaces, devices or units, which can be in electrical, mechanical or other forms.

The units described as separate components may or may not be physically separated, and the components displayed as units may or may not be physical units, that is, they may be located in one place or distributed onto a plurality of network units. Some or all of the units can be selected according to actual needs to achieve the purpose of this embodiment.

In addition, functional units in various embodiments of the present disclosure may be integrated into one processing unit, or each unit may exist physically alone, or two or more units may be integrated into one unit.

If the functions are realized in the form of software functional units and sold or used as independent products, they can be stored in a processor-executable, nonvolatile, computer-readable storage medium. Based on this understanding, the essential part of the technical solution of the present disclosure, or the part that contributes to the prior art, or a part of the technical solution can be embodied in the form of a software product, which is stored in a storage medium and includes several instructions to cause a computer device (which can be a personal computer, a server, a network device, etc.) to execute all or part of the steps of the method described in various embodiments of the present disclosure. The aforementioned storage medium includes: U disk, mobile hard disk, Read-Only Memory (ROM), Random-Access Memory (RAM), magnetic disk or optical disk and other mediums that can store program codes.

If the technical solution of the present disclosure involves personal information, the products to which the technical solution of the present disclosure is applied should have clearly informed the personal information processing rules and obtained individual consent before processing the personal information. If the technical solution of the present disclosure involves sensitive personal information, the products to which the technical solution of the present disclosure is applied should have obtained individual consent before processing the sensitive personal information, and at the same time satisfied the requirements of “express consent”. For example, definite and obvious signs should be set at personal information collection devices, such as cameras, to inform that personal information collection range has been entered, and personal information will be collected. If an individual voluntarily enters the collection range, it will be regarded as agreeing to collect his/her personal information; alternatively, under the condition that the personal information processing rules are informed by obvious signs/information on the personal information processing devices, the personal authorization is obtained by pop-up information or asking individuals to upload their personal information by themselves. Among them, the personal information processing rules can include personal information processors, personal information processing purposes, processing methods, types of personal information as processed and other information.

Finally, it should be explained that the above-mentioned embodiments are only exemplary implementations of the present disclosure, which are used to illustrate but not to limit the technical solution of the present disclosure. The scope of protection of the present disclosure is not limited to this. Although the present disclosure has been described in details with reference to the above-mentioned embodiments, it should be understood by those ordinary skilled in the field that any person familiar with the technical field can still modify or easily conceive of changes to the technical solution recorded in the above-mentioned embodiments or equivalent replacement of some technical features can be made thereto within the technical scope of the present disclosure, while these modifications, changes or substitutions do not make the essence of the corresponding technical solution deviate from the spirit and scope of the technical solution of the embodiment of the present disclosure, and should be included in the scope of protection of the present disclosure. Therefore, the scope of protection of the present disclosure should be based on the scope of protection of the claims.

The invention claimed is:

1. A comic image generating method, comprising:

acquiring target objects of a plurality of categories in a comic storyboard; wherein the plurality of categories at least comprise a character category, a scene category and a prop category;

determining, for the target object of each category of the plurality of categories, a target image matching the target object according to an object level of the target object; wherein the object level is determined according to a degree of importance of the target object, and target images corresponding to the target objects with different object levels are determined through different image determination modes; and combining the target images matching the target objects according to image layer levels corresponding to the plurality of categories, to obtain a comic image corresponding to the comic storyboard.

2. The method according to claim 1, wherein the determining a target image matching the target object according to an object level of the target object comprises:

in response to the object level of the target object belonging to a preset level, judging whether there is a generated image matching the target object by searching from an image asset library, wherein the image asset library comprises images pre-generated for candidate objects belonging to the preset level;

in response to an existence of a generated image matching the target object, determining the target image matching the target object according to the generated image.

3. The method according to claim 2, further comprising:

in response to an inexistence of a generated image matching the target object, and in response to the target object belonging to the scene category or the prop category, acquiring generation auxiliary text information corresponding to the target object;

generating the target image corresponding to the target object according to the generation auxiliary text information by using an artificial intelligence model; and storing the target image and the target object in the image asset library in an associated manner.

4. The method according to claim 2, further comprising:

in response to an inexistence of a generated image matching the target object, and in response to the target object belonging to the character category, acquiring generation auxiliary text information corresponding to the target object; and calling an object generation model corresponding to the target object, and generating the target image corresponding to the target object according to the generation auxiliary text information by using the object generation model.

5. The method according to claim 1, wherein the determining a target image matching the target object according to an object level of the target object comprises:

in response to the object level of the target object not belonging to a preset level, searching for a matching image matched with the target object from a plurality of authorized resource channels; and performing animation stylization processing on the matching image by using an artificial intelligence model, to obtain the target image.

6. The method according to claim 2, wherein the determining the target image matching the target object according to the generated image comprises:

acquiring generation auxiliary text information corresponding to the target object; and performing content adjustment to an image content of the generated image according to the generation auxiliary text information by using an artificial intelligence model, to obtain the target image.

7. The method according to claim 6, wherein the generation auxiliary text information comprises viewing angle auxiliary text information for indicating an observation viewing angle corresponding to the target object, wherein the performing content adjustment to an image content of the generated image according to the generation auxiliary text information by using an artificial intelligence model, to obtain the target image, comprising:

performing viewing angle switching to the image content of the generated image according to a target viewing angle indicated by the viewing angle auxiliary text information by using the artificial intelligence model, to obtain the target image matching the target viewing angle.

8. The method according to claim 6, wherein the generation auxiliary text information comprises shot type auxiliary text information for indicating shot type information corresponding to the target object;

the performing content adjustment to an image content of the generated image according to the generation auxiliary text information by using an artificial intelligence model, to obtain the target image, comprising:

performing shot type adjustment to the image content of the generated image according to a target shot type indicated by the shot type auxiliary text information by using the artificial intelligence model, to obtain the target image matching the target shot type.

9. The method according to claim 6, wherein the generation auxiliary text information comprises object expansion text information;

the performing content adjustment to an image content of the generated image according to the generation auxiliary text information by using an artificial intelligence model, to obtain the target image, comprising:

performing content expansion to the image content of the generated image according to an object to be expanded indicated by the object expansion text information by using the artificial intelligence model, to obtain the target image comprising the object to be expanded.

10. The method according to claim 3, wherein the generation auxiliary text information is determined by:

acquiring a target novel from which a comic is to be generated;

splitting the target novel according to a novel content of the target novel to obtain novel segments corresponding to the target novel, and determining the comic storyboard corresponding to each novel segment and the target objects in each comic storyboard; and for each target object, determining the generation auxiliary text information corresponding to the target object according to a segment content of the novel segment corresponding to the target object.

11. A computer device, comprising at least one processor and a memory on which machine-readable instructions executable by the processor are stored, wherein the processor is configured to execute the machine-readable instructions stored in the memory, and the machine-readable instructions, when executed by the processor, are configured to cause the processor to execute a comic image generating method, comprising:

acquiring target objects of a plurality of categories in a comic storyboard; wherein the plurality of categories at least comprise a character category, a scene category and a prop category;

determining, for the target object of each category of the plurality of categories, a target image matching the target object according to an object level of the target object; wherein the object level is determined according to a degree of importance of the target object, and target images corresponding to the target objects with different object levels are determined through different image determination modes; and combining the target images matching the target objects according to image layer levels corresponding to the plurality of categories, to obtain a comic image corresponding to the comic storyboard.

12. The computer device according to claim 11, wherein in the comic image generating method, the determining a target image matching the target object according to an object level of the target object comprises:

in response to the object level of the target object belonging to a preset level, judging whether there is a generated image matching the target object by searching from an image asset library, wherein the image asset library comprises images pre-generated for candidate objects belonging to the preset level;

in response to an existence of a generated image matching the target object, determining the target image matching the target object according to the generated image.

13. The computer device according to claim 12, wherein the comic image generating method further comprises:

in response to an inexistence of a generated image matching the target object, and in response to the target object belonging to the scene category or the prop category, acquiring generation auxiliary text information corresponding to the target object;

generating the target image corresponding to the target object according to the generation auxiliary text information by using an artificial intelligence model; and storing the target image and the target object in the image asset library in an associated manner.

14. The computer device according to claim 12, wherein the comic image generating method further comprises:

in response to an inexistence of a generated image matching the target object, and in response to the target object belonging to the character category, acquiring generation auxiliary text information corresponding to the target object; and calling an object generation model corresponding to the target object, and generating the target image corresponding to the target object according to the generation auxiliary text information by using the object generation model.

15. The computer device according to claim 11, wherein in the comic image generating method, the determining a target image matching the target object according to an object level of the target object comprises:

in response to the object level of the target object not belonging to a preset level, searching for a matching image matched with the target object from a plurality of authorized resource channels;

performing animation stylization processing on the matching image by using an artificial intelligence model, to obtain the target image.

16. The computer device according to claim 12, wherein in the comic image generating method, the determining the target image matching the target object according to the generated image comprises:

acquiring generation auxiliary text information corresponding to the target object; and performing content adjustment to an image content of the generated image according to the generation auxiliary text information by using an artificial intelligence model, to obtain the target image.

17. The computer device according to claim 16, wherein in the comic image generating method, the generation auxiliary text information comprises viewing angle auxiliary text information for indicating an observation viewing angle corresponding to the target object, wherein the performing content adjustment to an image content of the generated image according to the generation auxiliary text information by using an artificial intelligence model, to obtain the target image, comprising:

performing viewing angle switching to the image content of the generated image according to a target viewing angle indicated by the viewing angle auxiliary text information by using the artificial intelligence model, to obtain the target image matching the target viewing angle.

18. The computer device according to claim 16, wherein in the comic image generating method, the generation auxiliary text information comprises shot type auxiliary text information for indicating shot type information corresponding to the target object;

the performing content adjustment to an image content of the generated image according to the generation auxiliary text information by using an artificial intelligence model, to obtain the target image, comprising:

performing shot type adjustment to the image content of the generated image according to a target shot type indicated by the shot type auxiliary text information by using the artificial intelligence model, to obtain the target image matching the target shot type.

19. The computer device according to claim 16, wherein in the comic image generating method, the generation auxiliary text information comprises object expansion text information;

the performing content adjustment to an image content of the generated image according to the generation auxiliary text information by using an artificial intelligence model, to obtain the target image, comprising:

performing content expansion to the image content of the generated image according to an object to be expanded indicated by the object expansion text information by using the artificial intelligence model, to obtain the target image comprising the object to be expanded.

20. A non-transient computer-readable storage medium on which a computer program is stored, wherein the computer program, when executed by a computer device, is configured to cause the computer device to execute a comic image generating method, comprising:

acquiring target objects of a plurality of categories in a comic storyboard; wherein the plurality of categories at least comprise a character category, a scene category and a prop category;

determining, for the target object of each category of the plurality of categories, a target image matching the target object according to an object level of the target object; wherein the object level is determined according to a degree of importance of the target object, and target images corresponding to the target objects with different object levels are determined through different image determination modes; and combining the target images matching the target objects according to image layer levels corresponding to the plurality of categories, to obtain a comic image corresponding to the comic storyboard.

* * * * *